United States Patent Office 2,950,117
Patented Aug. 23, 1960

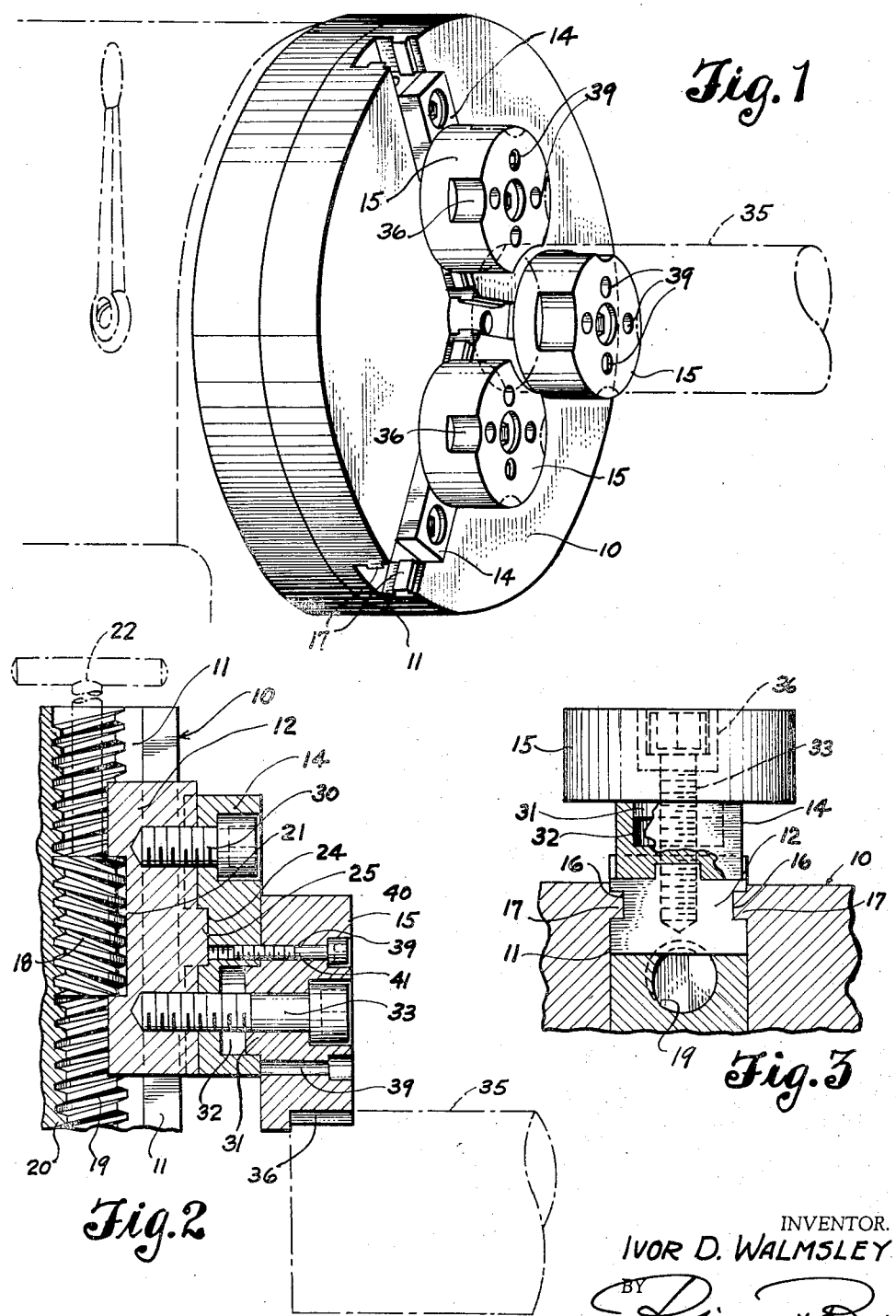

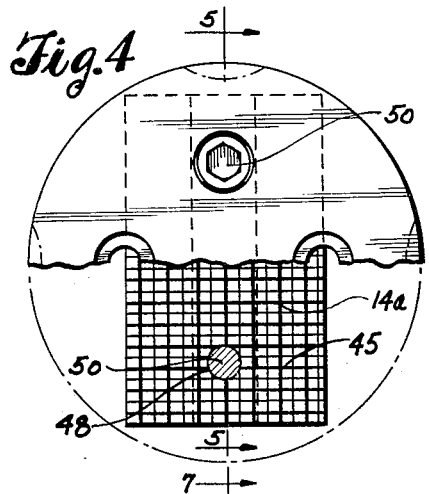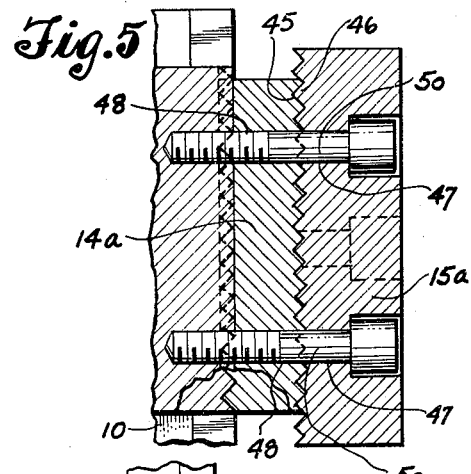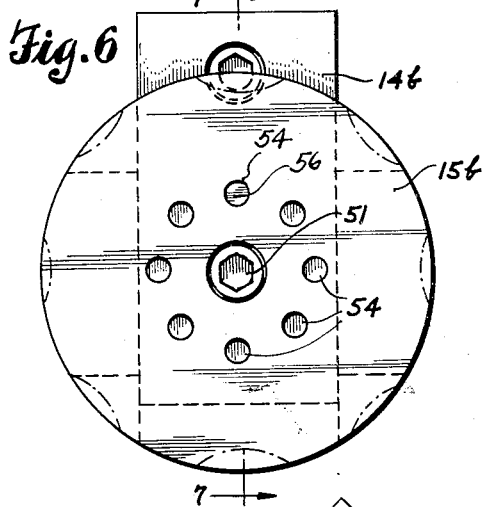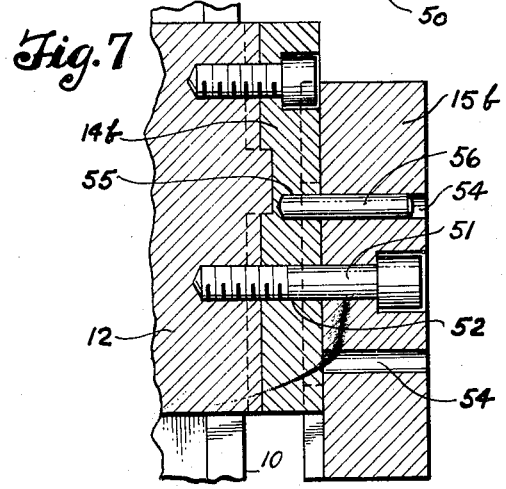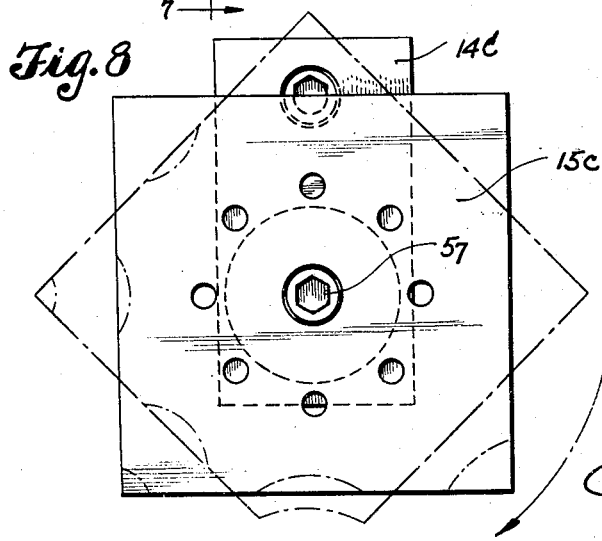

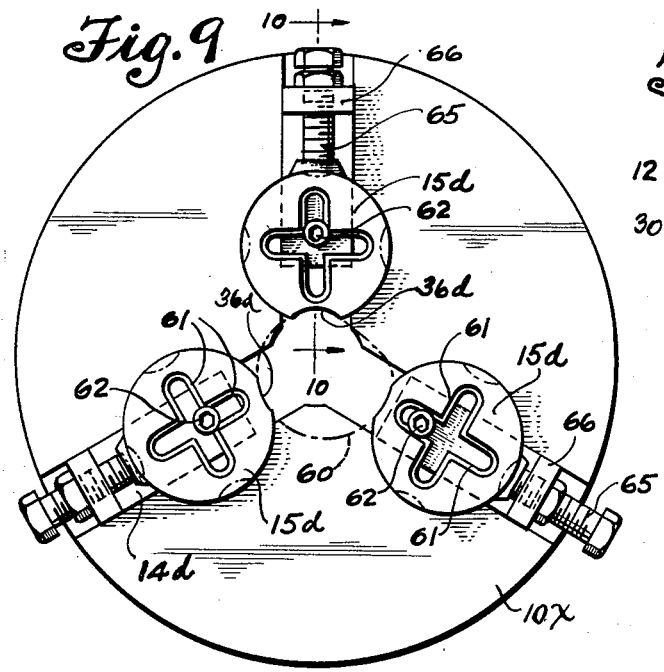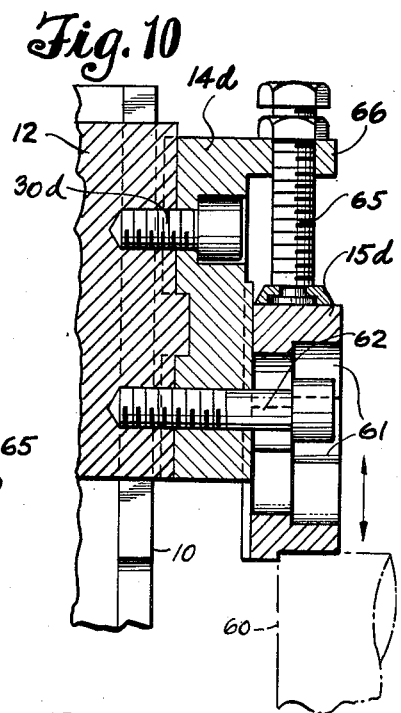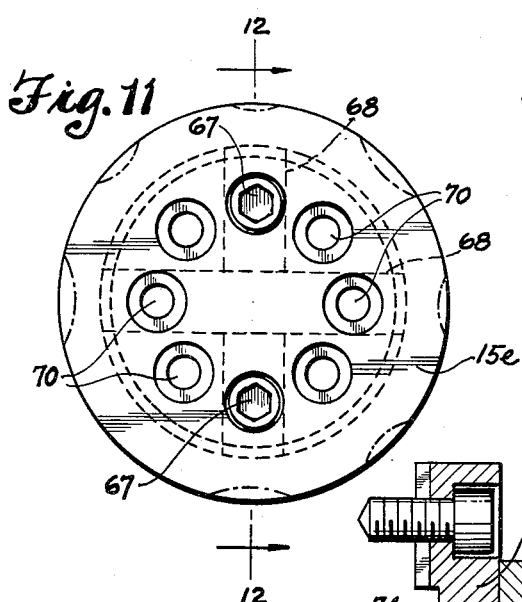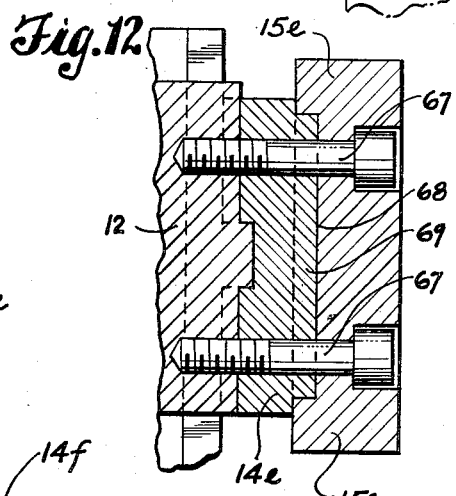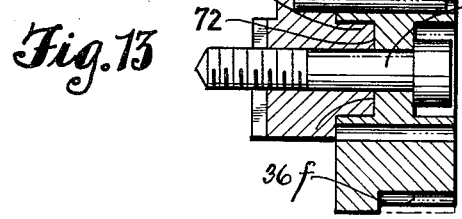

2,950,117

TURNING LATHE

Ivor D. Walmsley, 2432 W. 63rd, Seattle, Wash.

Filed Mar. 3, 1958, Ser. No. 718,614

1 Claim. (Cl. 279—123)

This invention relates to turning lathes included in that class generally designated as an "engine lathe." More particularly, the invention has reference to improvements in chucks as employed in engine lathes for the holding and driving or turning of work pieces while being machined in the lathe.

The most common type of chuck with, or to which the present invention is applicable for use, comprises a rotatably driven face plate, formed with a plurality of radially directed slots or grooves in which the chuck jaws are mounted for adjustment into holding engagement with the work piece to hold and drive it for machining. The jaws of such chucks are of various forms or kinds, and various means are provided for their adjustment. However, regardless of kind, or means of adjustment, the pressure under which they are clamped against the work pieces, and the strain to which they are subjected in use ultimately causes the faces or surfaces which engage the work pieces to become worn, or otherwise damaged and it becomes necessary or desirable that they be replaced.

In view of the above noted desirability for the replacement of chuck jaws and also in view of the loss of time, the inconvenience and incident expense of making such replacement, it has been the principal object of the present invention to provide chuck jaws with relatively inexpensive and easily replaceable work piece engaging parts which materially reduce the inconvenience, expense and the necessity for jaw replacement.

It is a further object of the present invention to provide the chuck jaws with adapters for the mounting of the present replaceable work piece engaging parts which, for purpose of this specification, will be designated as "jaw heads" and which adapters provide for the easy, quick and accurate adjustment of the jaw heads to bring different surfaces thereof into position for holding the work pieces.

It is a further object of the present invention to provide jaw heads, as above stated, from relatively soft metal, as compared with the hardened metal of the master jaws and adapters, so that work seating surfaces to suit the particular piece being held, may be easily machined therein.

A further object of the invention resides in the provision of adapters of various forms to accommodate different designs or forms of master jaws, and to suit various shapes or forms of jaw heads embodied by this invention that may be employed.

Still further objects and advantages of the present invention reside in the details of construction of the various parts used in combination, and in their mode or manner of use, as will hereinafter be fully described.

In accomplishing the above mentioned and other objects of the invention, I have provided the improved details of construction, the preferred forms of which are illustrated in the accompanying drawings, wherein:

Fig. 1 is a perspective view of a lathe chuck having master jaws mounted for radial adjustment in the face plate, and equipped with adjustable and replaceable jaw heads in accordance with the teaching of the present invention.

Fig. 2 is a section taken through one of the master jaws as equipped with an adapter and jaw head in accordance with the present invention; the section being taken centrally and longitudinally of one of the face plate grooves in which the master jaw is adjustably mounted.

Fig. 3 is a cross-sectional detail through a portion of the face plate, showing the master jaw as adjustably mounted therein; the adapter and the jaw head as mounted by the adapter.

Fig. 4 is a face view of one form of jaw head; a part thereof being broken away to show the surface formation of its adapter.

Fig. 5 is a section taken on line 5—5 in Fig. 4.

Fig. 6 is a face view of another form of jaw head as applied to its adapter.

Fig. 7 is a section through the parts, taken on line 7—7 in Fig. 6.

Fig. 8 is a face view of still another form of jaw head.

Fig. 9 is a face view of a chuck showing the manner of mounting the master jaws therein for adjustment, and showing the master jaws as equipped with another form of jaw head.

Fig. 10 is a section taken on line 10—10 in Fig. 9.

Fig. 11 is a face view of yet another form of adapter.

Fig. 12 is a section taken on line 12—12 in Fig. 11.

Fig. 13 is a section taken through an adapter and jaw head having another form of locking means.

Referring more in detail to the drawings:

First giving consideration to the chuck as seen in Fig. 1; the chuck is designated in its entirety by numeral 9. It comprises a face plate 10 that is mounted for axial rotation in the usual way and rotatably driven by means not herein shown since it forms no part of the present invention. The face plate 10 is formed in its outer surface with a plurality of slots or grooves 11, extending radially from its center. In this showing there are three slots and they are equally angularly spaced. Contained in each slot is a master jaw 12, mounted for sliding adjustment toward and from the plate center. Each of the master jaws 12 has a flat outer surface, parallel with the outer face of plate 10, and mounted on this flat surface is an adapter 14 for mounting the part which I have designated as the "jaw head" 15.

It has been shown in Fig. 3, that the master jaw 15 is grooved along its opposite sides, as at 16, to receive retaining ribs 17 formed on the opposite sides of the containing slot 11 of the face plate, and that longitudinal adjustment of the jaw is effected and retained by a screw 18 that is contained in a threaded bore 19 formed in a block 20 that is fixed in the slot 11. One side portion of the screw extends into a recess 21 in the bottom or inside surface of the master jaw, with opposite ends of the screw engaging the end surfaces of this recess. Thus, by turning the screw, the jaw will be adjusted inwardly or outwardly accordingly. Adjustment of the screw is effected by use of a tool, as shown in dash lines at 22 in Fig. 2, applied thereto through the open end of the threaded bore.

Each adapter 14 is in the form of a rectangular block that rests flatly upon the outer face of the corresponding master jaw and which is formed in its under surface with a shallow socket 24 which is fitted over a stud or boss 25 formed on the top surface of the master jaw. The adapter is held in place on the master jaw by a screw bolt 30 that is passed through a hole in its outer end portion and threaded into the master jaw; the head of this screw being socketed and is counter-sunk into the adapter.

The jaw head 15, as shown in Fig. 2 is of circular form and of substantial thickness. It is formed on its underside with a central hub or boss 31 rotatably fitted in a socket 32 formed in the top surface of and near the inner end portion of the adapter. The head 15 is held in place on the adapter by a bolt 33 that is passed centrally through it, coaxially of hub 31 and is threaded through the adapter and then into the master jaw as shown in Fig. 2; the head of bolt 33 being counter sunk in the jaw head.

It will be observed also by reference to Fig. 2, that the jaw head 15 projects beyond the inner end of the adapter 14 for contact with the work piece which is to be held, such as the shaft designated by reference character 35 in Fig. 1. It is by the clamping of the several jaw heads against the work piece that the piece can be held and driven for machining in the lathe.

It is desirable, and also is a customary procedure, to form the jaw heads 15 with seats, such as that shown at 36 in Fig. 2 for engaging the work piece. The procedure in forming these seats in the several heads as applied to a chuck is to first secure the jaw heads against any possible turning on their securing bolts 33 and then adjusting them to a position corresponding to that for holding a work piece of a certain diameter. The seats 36 are then formed in the peripheral edges of the jaw heads, to the cylindrical curvature that will suit the work piece to be machined. One or more of the jaws may then be adjusted as required to receive the work piece between the jaw heads. The work piece is then placed between the jaws and they are tightened thereagainst to hold it, for example, as seen in Fig. 1.

If a work piece 35 of smaller or larger diameter is later to be applied for machining, new seats 36 may be desired. In such a case, the jaw heads are rotatably adjusted to bring fresh surface portions thereof into position, and then new seats are machined therein to accommodate the curvature of the work piece at hand.

To positively hold a jaw head 15 at any one of a plurality of positions of rotatable adjustment, I now provide each block with a plurality of holes 39, as seen in Fig. 1, equally spaced from the center bolt 33 and also equally angularly spaced from each other, and I provide the underlying adapter 14 with a threaded hole 40 with which any one of the holes 39 in the jaw head can be registered to receive a locking bolt 41, as seen in Fig. 2. In the present showing, in Fig. 1, the jaw heads 15 are formed with four bolt holes 39. However, a more or less number might be provided.

It is further to be explained that while the master jaws 12 and adapters 14 preferably are made of hardened metal such as tool steel, the jaw heads 15 may be advantageously made of comparatively soft metal to provide for the easy machining of the seats 36 therein.

It is not the intent that the present invention be restricted to chucks of any specific form of construction, or to any specific jaw adjusting means since the same principal is applicable to various forms, as will now be explained.

In Figs. 4 and 5, I have illustrated an adapter 14a that is formed across its outer surface with V-shaped grooves 45. The jaw head 15a has its under surface similarly formed with ridges 46. In each case, the grooves and ridges cross each other at right angles. Thus, the jaw head 15a can be fitted to the adapter 14a in four different positions, by rotating it through 90° intervals. The jaw head is formed with four bolt passing holes 47, equally spaced from its center and also equally angularly spaced. The adapter 14a is provided with two bolt holes 48 therethrough, located in its longitudinal center line, with which diametrically opposite holes 47 of the head may be registered. Locking bolts 50 are then passed through the registered holes 47 and 48 and threaded into the master jaw 12. The adapter 14b is held in place by means like or corresponding to the means of Fig. 2. The jaw head 15b in this instance can be rotatably advanced 45° intervals and secured. For this purpose it is formed with a circle of equally spaced holes 54, concentric thereof, that may be successively registered with a hole 55 in the adapter, as seen in Fig. 7, to receive a removable locking pin 56.

In Fig. 8, I have shown a jaw head 15c which is in the form of a square block mounted by a securing bolt 57 that is passed through it at the center. The adapter 14c for this jaw head is like that shown in Fig. 7, and the jaw head is secured thereto in the same manner. Also, the jaw head is mounted for rotary adjustment about its center bolt when the bolt is loosened and pin 56 removed and it is adapted to be secured at its different positions of adjustment in the same manner as is the jaw head 15b of Figs. 6 and 7. The adjustment of jaw head 15c is such that either a corner, or a flat side surface can be brought into the seat machining position.

In Figs. 9 and 10, I have shown the master jaws 12, as mounted in face plate 10x, to be equipped with adapters 14d, which are equipped with jaw heads 15d which are adapted to engage work pieces of irregular form, such as that designated in dash-dot lines at 60 in Fig. 9. In this combination of parts, the adapters 14d are mounted, as in Fig. 2, on the corresponding master jaws and secured by bolts 30d. The jaw heads 15d are circular, and are formed through their centers with radial slots 61 which cross each other at right angles. Bolts 62, that are passed downwardly through the slots, then through the adapters and threaded at their inner ends into the master jaws, may be tightened to hold the jaw heads at any of their various positions of adjustment. The adjustment of a jaw head 15d, against the work piece after being formed with a seating surface, as at 36d, is made by a clamp screw 65 that is threaded through an upstanding boss 66 at the outer end of the adapter 14d, and against the outer face of the jaw head. Adjustment is then secured by tightening the center bolt.

In Figs. 11 and 12, I have shown a jaw head 15e secured on the adapter 14e by two bolts 67. The under face of the head 15e is formed with milled channels 68, crossed at right angles, and the adapter 14e is formed on its top surface with a longitudinal rib 69 for seating in a selected channel of the head to retain an adjustment. The jaw head 15e in this instance, is formed with a circular row of holes 70 to receive the securing bolts 67 therethrough; these bolts passing through the head and the adapter and are threaded at their inner ends into the master jaw thus to secure both the adapter and the jaw head. The adapter 14e is here shown to be locked against rotation or movement in the master jaw by interfitted grooves and ribs on their engaging surfaces as noted in Fig. 12.

Fig. 13 shows a jaw head 15f substantially like that of Fig. 6 except in the provision therein in its under surface and concentric thereof, of a socket 72 designed to fit a circular boss 74 on the adapter, 14e. This socket is of the same diameter and concentric of that on the opposite side into which the head of the bolt 73 is countersunk. The feature of this jaw head is that it can be inverted, thus to give additional surface for the forming of seats 36f for engaging the work pieces.

By the provision of the master jaws with jaw heads, as above described, and by the mounting and securing of the jaw heads in the manner described, the frequent replacement of expensive jaws, as previously required, is overcome or avoided, thus eliminating loss of time, inconvenience and expense the provision for rotary adjustment of the jaw heads makes possible the formation therein of seating surfaces for work pieces of various forms, and diameters. The relatively soft metal of the work heads permits the easy machining of the seating surfaces therein and prevents the damaging or marring of the held pieces.

What I claim as new is:

A chuck for an engine lathe comprising a round face plate mounted for axial rotation, a plurality of radial channels in the exposed face of said face plate, a master jaw adjustably mounted in each of said channels, a jaw head adapter plate releasably mounted in fixed position on each of said master jaws and extending outwardly beyond said exposed face of said face plate, a jaw head adjustably mounted on each adapter plate for rotary adjustment about an axis that is parallel to the axis of rotation of the face plate, a cylindrical socket in said adapter plate adjacent one end thereof, a hub on the jaw head adapted to be revolvably positioned in said socket, a hole in said adapter plate radially spaced from said recess and a plurality of passages through said jaw head adapted to be selectively aligned with the hole in said adapter plate, a bolt extending through the aligned passage into said hole for securing the jaw head in fixed position on said adapter plate, aligned holes in said jaw head, adapter plate and master jaw and a jaw head securing bolt extending through said aligned holes and secured at its inner end to said master jaw.

References Cited in the file of this patent

UNITED STATES PATENTS

| | | |
|---|---|---|
| 1,033,547 | Cornil | July 23, 1912 |
| 1,321,208 | Hinnershitz | Nov. 11, 1919 |
| 2,543,117 | Mackmann | Feb. 27, 1951 |
| 2,708,118 | Kuchenbrod | May 10, 1955 |
| 2,729,995 | Friedmann | Jan. 10, 1956 |
| 2,815,959 | Vandenberg | Dec. 10, 1957 |
| 2,896,958 | Strauss | July 28, 1959 |

FOREIGN PATENTS

| | | |
|---|---|---|
| 1,098,257 | France | Mar. 2, 1955 |